UNITED STATES PATENT OFFICE.

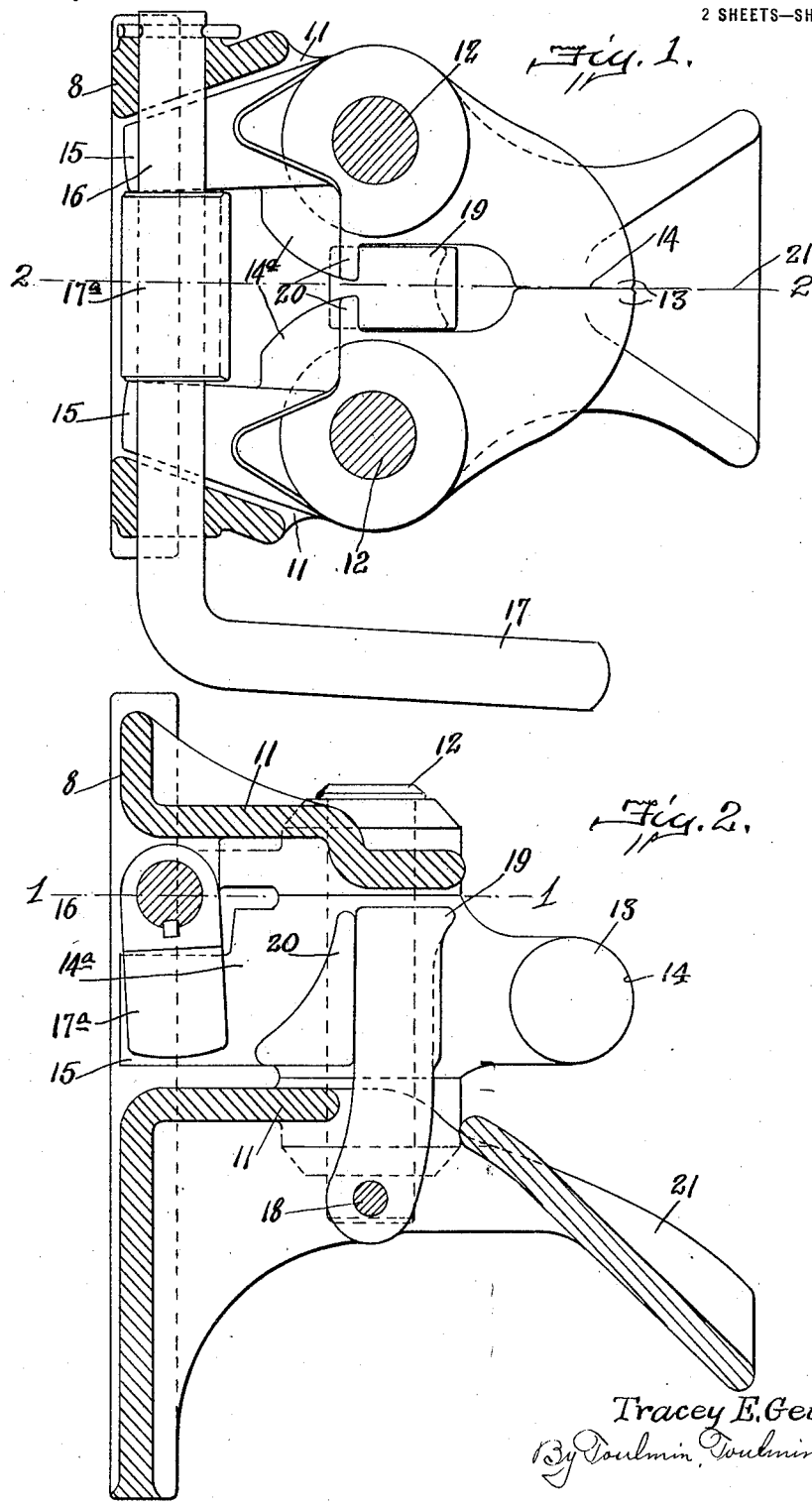

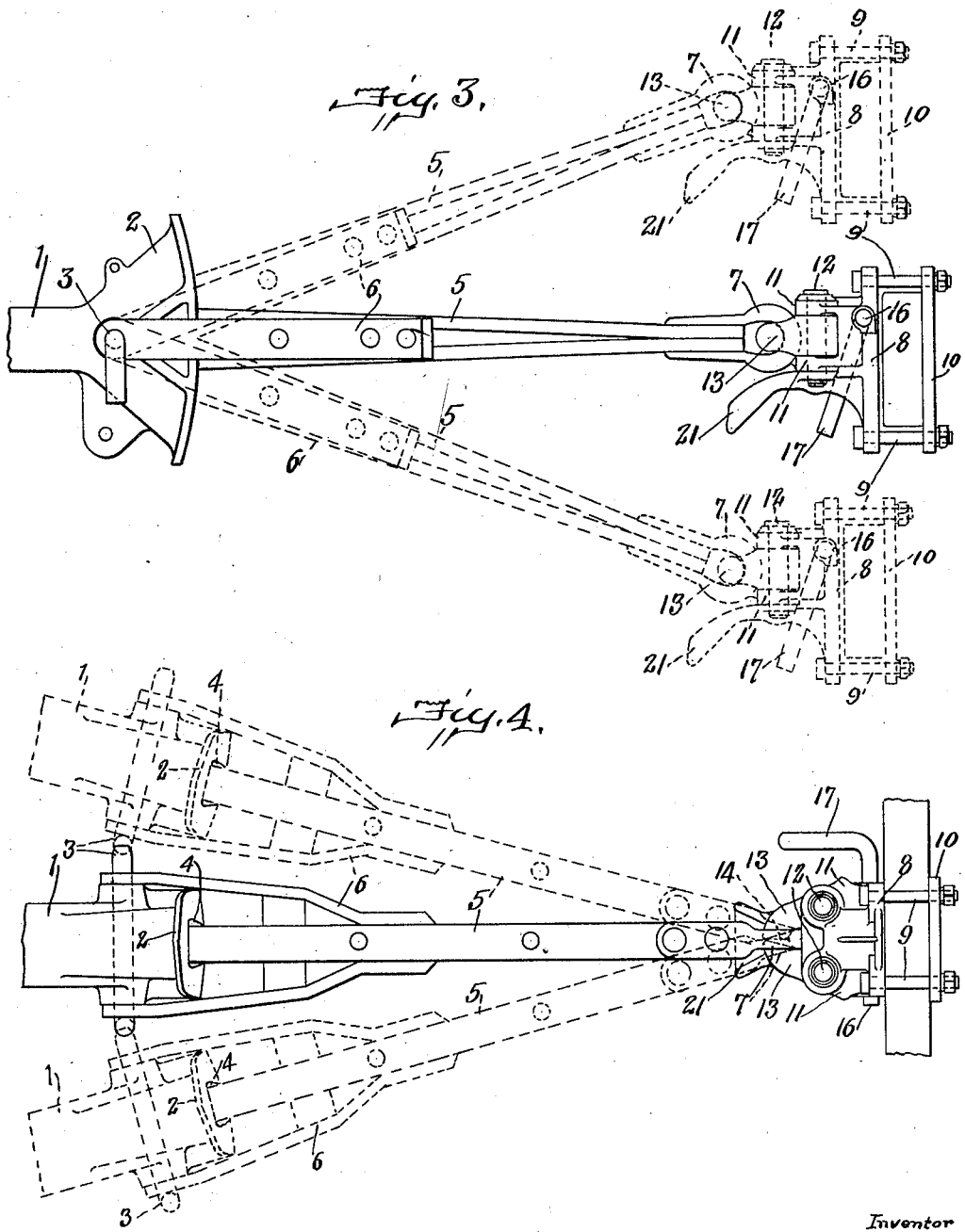

TRACEY E. GEIGER, OF TROY, OHIO, ASSIGNOR TO THE TROY WAGON WORKS COMPANY, OF TROY, OHIO, A CORPORATION OF OHIO.

COUPLING MECHANISM.

1,321,519. Specification of Letters Patent. Patented Nov. 11, 1919.

Application filed November 10, 1917, Serial No. 201,273. Renewed September 18, 1919. Serial No. 324,579.

*To all whom it may concern:*

Be it known that I, TRACEY E. GEIGER, a citizen of the United States, residing at Troy, in the county of Miami and State of Ohio, have invented certain new and useful Improvements in Coupling Mechanism, of which the following is a specification, reference being had therein to the accompanying drawing.

This invention relates to coupling mechanism or devices for vehicles or cars and aims to provide a simple and durable mechanism for connecting vehicles. It is especially adapted to rough use in connection with trucks and trailing vehicles which run on roads and uneven ground and not on tracks. It is especially adapted to trucks and trailing vehicles which run on roads and over rough ground.

In particular the invention provides a simple draft connection for automobile trailers adapted to be employed by unskilled labor which is frequently used with this type of vehicle.

A further object is to provide a coupling mechanism of general use which may be manufactured at a low cost, is not likely to break and is easily and positively coupled and locked.

Such a device is shown in the accompanying drawings in which Figure 1 is a horizontal section on the line 1—1 of Fig. 2 showing the coupling attached to a leading vehicle;

Fig. 2 is a vertical section on the line 2—2 of Fig. 1;

Figs. 3 and 4 are somewhat diagrammatic, Fig. 3 being a side elevation and Fig. 4 a plan view showing fragmentary portions of both the leading and the trailing vehicles and illustrating the range of adjustment of the coupling for uneven or rough ground.

It will be readily understood that a coupling mechanism adapted to couple trailing vehicles to automobile trucks require a considerable range of adjustment so as to take care both of uneven ground and of negotiating curves of quite short radius. Thus the construction must be such that the leading vehicle may be considerably above or below the trailing vehicle and also may carry the trailing vehicle properly around curves of short radius.

Referring first to Figs. 3 and 4 the only portion of the trailing vehicle there shown is the draft connection 1. This may be a bar of any ordinary type and at its forward end it is provided with a curved plate 2 in which a connecting pin 3 is fast. Traversed by this pin 3 and passing through an aperture 4 in the curved plate 2 is a connecting bar 5 which at its forward end is fastened to the coupling device as later described. If desired the connecting bar 5 may be provided with supporting or strengthening pieces 6, these being fastened at their forward ends to the bar 5 and having their rearward ends traversed by the connecting pin 3.

It will be seen that the construction described forms a connection by which the trailing vehicle may be readily turned, it being understood, of course, that the draft bar 1 is pivoted at some point to the trailing vehicle and is provided with connections for turning the leading wheels thereof.

The connection of the bar 5 to the coupling device proper is indicated in Figs. 3 and 4. The detail construction of this coupling device will be given hereafter, but attention may be called here to the fact that as shown in Fig. 3 the leading vehicle to which the coupling mechanism is fast has a considerable range of vertical adjustment relative to the trailing vehicle. This is indicated by the dotted line constructions of Fig. 3 showing positions both above and below the level of the trailing vehicle which may be assumed by the leading truck. Also in Fig. 4 the extent to which the leading vehicle carrying the coupling device may be turned relative to the trailing vehicle is indicated. The dotted line constructions show positions to the left and the right of the normal central position, this central position being, of course, the relation obtaining when the two vehicles are moving in a straight line, while the dotted line construction shows the relation existing when the vehicles are passing around a curve. It will be seen that the connecting bar 5 has at its forward end a circular eye 7 which is the portion directly attached to the coupling device proper.

Referring now to Figs. 1 and 2, the detail construction of the coupling device may be explained.

A supporting frame 8 is adapted to be fastened to the rear end of the leading vehicle, as, for example, by bolts 9 passing through the rear end of the vehicle and being held by a plate 10 inside the vehicle.

This supporting frame 8 may be an integral casting, as shown, and is provided with ears 11, these ears being duplicated both above and below, as shown in Fig. 2, and having apertures through which supporting pins 12 may pass. These pins may be headed at their upper ends, as shown, and be prevented from being withdrawn by any desired device, such, for example, as a cotter pin.

Carried on these pins 12 between the upper and lower ears 11 of the supporting frame 8 are two coupling jaws 13, these jaws being adapted to be brought together at abutting edges 14 and being shaped to surround the eye 7 of the connecting bar 5. On the side of the coupling jaws 13 toward the leading vehicle which may be termed the forward side of the jaws are curved portions 14 and locking portions 15. A shaft 16 passes horizontally through the supporting frame 8 and at one end is provided with a handle 17 for operating it. Fast on the shaft 16 is a locking element 17$^a$, this being above and between the forward locking projections 15 of the coupling jaws when the handle is elevated and serving when the handle 17 is depressed to force the coupling jaws to the position of Fig. 1 and to lock them in that position. From Fig. 2 it will be seen that the locking extensions 15 of the coupling jaws do not extend as high as the shaft 16 and therefore the locking element 17$^a$ may be elevated above the highest portion of the extensions 15. When this is done the locking extensions 15 may be moved toward each other under the locking element 17$^a$ and this movement, referring to Fig. 1, obviously opens the rearward end of the coupling jaws 13 by separating their abutting edges 14.

A horizontal pin 18 passed through the supporting frame 8 serves as a pivot for an operating element 19. As indicated in Fig. 1 this element projects in the rear of lugs 20 on the coupling jaws 13 and is positioned to be engaged by the eye 7 of the connecting bar 5 when the vehicles are to be coupled.

In the position of the parts shown in Figs. 1 and 2 the coupling of the two vehicles cannot be accomplished. In order to couple them the hand lever 17 is moved upwardly from its position of Fig. 3 so as to carry the locking element 17$^a$ above the forward extensions 15 of the coupling jaws. Then the rearward ends of the jaws 13 may be separated by rocking them around the pins 12 so as to separate the abutting edges 14. Such movement rocks the operating arm 19 through engagement therewith of the lugs 20 of the coupling jaws. Thus the jaws are opened and the operating element 19 is moved forward at its upper end. The connecting bar 5 may then be brought to proper position and the eye 7 inserted between the coupling jaws. Of course, this is ordinarily done by backing the leading vehicle, thus moving the coupling mechanism to a connecting position with the eye 7. The relative movement of the eye 7 of the connecting bar 5, which would be toward the left in Fig. 2, causes the eye 7 to engage the operating element 19 and rock it around its pivot pin 18. Thereby the operating element 19 engages the lugs 20 and rocks the coupling jaws so as to bring them together at their rearward ends along the abutting edges 14 and to separate their forward locking extensions 15, thus restoring the coupling parts to the position shown in Fig. 1. Then the downward movement of the locking handle 3 moves the locking plate 17$^a$ to the position of Fig. 2, thereby interposing this plate between the forward extensions 15 of the coupling jaws and locking them tightly in coupling position with the eye 7 of the connecting bar 5 held against movement by the curved coupling jaws.

It will be seen that the construction employed is well adapted to accomplish the objects first stated. The coupling is simple and rugged in construction, thus withstanding hard usage and being easily operated by unskilled or careless workmen. It has a wide range of adjustment, because of the pivotal connection of eye 7 and coupling jaws 13 and thus is adapted to uneven ground and to short turns, without putting damaging stresses on the parts.

To aid in making the coupling connection the frame 8 may be provided with an integral portion or apron 21. This projects rearwardly and downwardly and thus the eye 7 of connecting bar 5 may engage the apron 21 as the vehicles are moved toward each other and guide the eye upwardly into its desired position between the coupling jaws 13.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a coupling device, the combination, with a supporting frame comprising a plate and ears projecting therefrom, of two coupling jaws having locking portions, parallel pins passing through said ears and on which said jaws are pivoted, a locking element pivoted in said plate, and positioned to pass between the locking portions of said jaws, and a handle fast to said locking element.

2. In a coupling device, the combination, with a supporting frame, comprising a plate and ears projecting therefrom, of two coupling jaws having locking portions, pins passing through said ears and forming parallel axes for said jaws, an operating element pivoted between said jaws against which a connecting element may abut, said operating element being positioned to engage said coupling jaws and force them together, a locking element pivoted in said plate and positioned to pass between said locking portions of said coupling jaws, and means for operating said locking element.

3. In a coupling device, the combination, with a supporting frame, comprising a plate having ears projecting therefrom, of coupling jaws pivotally mounted in said ears and adapted to be moved to abut each other so that a connecting element may be held between the jaws, an operating element constructed to be engaged by the connecting element and contacting with said jaws to force the same into coupling position, and means for locking said jaws in coupling position.

4. In a coupling device, the combination, with a draft bar attached to a trailing vehicle, and comprising a vertically positioned guide plate having a horizontal pivot therein, and a vehicle connecting bar having an eye and carried on said horizontal pivot and guided by said guiding plate, of a coupling device carried by a leading vehicle comprising a supporting frame and coupling jaws pivoted to said frame, and said coupling jaws being operable to pass through the eye of the connecting bar.

5. In a coupling device, the combination, with a draft bar attached to a trailing vehicle and comprising a vertical guiding plate having a horizontal pivot therein and a vehicle connecting bar having an eye and carried on said horizontal pivot and guided by said plate, of a supporting frame carried by a leading vehicle comprising an attaching plate and coupling jaws having locking portions, an operating element positioned to be engaged by said connecting bar and constructed to force said jaws together through the eye of the connecting bar, and means for locking said coupling jaws in coupling position.

6. In a coupling device, the combination, with a draft bar attached to a trailing vehicle, a vertically disposed guide carried by the draw bar to regulate the movements of the connecting bar, a connecting bar attached to the draft bar, a frame carried by a leading vehicle and having an angularly disposed portion to guide the free end of the connecting bar, and coupling jaws supported by said frame and adapted to engage the end of the connecting bar when so guided into said frame.

7. In a coupling device, the combination, with a draft bar attached to a trailing vehicle, a connecting bar attached to the draft bar, a frame carried by a leading vehicle and having an angularly disposed portion to guide the free end of the connecting bar, coupling jaws supported by said frame and adapted to engage the end of the connecting bar when so guided into said frame, and means actuated by said connecting bar to lock said jaws when so engaged.

In testimony whereof I affix my signature.

TRACEY E. GEIGER.

Copies of this patent may be obtained for five cents each, by addressing the "Commissioner of Patents, Washington, D. C."